United States Patent Office 2,698,327
Patented Dec. 28, 1954

2,698,327

N-DIALKYLAMINOALKYL-N-DIARYLALKYL-AROYLAMIDES

John W. Cusic, Skokie, Ill., assignor to G. D. Searle & Co., Chicago, Ill., a corporation of Illinois No Drawing. Application February 28, 1952, Serial No. 274,069

12 Claims. (Cl. 260—295)

This invention relates to a group of new organic compounds and, specifically, to N-dialkylaminoalkyl-N-diarylalkyl-aroylamides, to their salts and to methods for their production. The amides which constitute my invention can be represented by the general basic structural formula

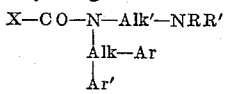

wherein X, Ar and Ar' are aromatic radicals of from six to twelve carbon atoms, Alk and Alk' are lower alkylene radicals and NRR' is a member of the class consisting of lower dialkylamino radicals and saturated nitrogen-containing heteromonocyclic radicals attached to the radical Alk' through a nitrogen in the heteromonocycle.

In the foregoing structural formula Ar and Ar' are lower aryl hydrocarbon radicals containing six to twelve carbons atoms such as phenyl, naphthyl, fluorenyl, phenanthryl, anthryl, as well as their lower alkyl substitution products such as tolyl, xylyl, cumyl, cymenyl, methylnaphthyl, ethylnaphthyl and the like.

The radical X can be an aryl hydrocarbon of the foregoing type. It can also be halogenated or lower alkoxylated as in the case of chlorophenyl, bromotolyl, iodonaphthyl, anisyl, phenetyl and like radicals. In addition X can also be an aromatic radical containing nitrogen as a heteroatom as in the case of pyridine.

The radicals Alk and Alk' are lower bivalent saturated aliphatic hydrocarbon radicals which are derived from straight chain or branched chain hydrocarbons such as ethylene, propylene, butylene, amylene, hexylene and polymethylene radicals such as trimethylene, tetramethylene, pentamethylene and hexamethylene and, in the case of Alk only, methylene. Among the radicals which R and R' can represent are such lower aliphatic groups as methyl, ethyl, propyl, butyl, amyl, hexyl, cyclobutyl, cyclopentyl and cyclohexyl, wherein the propyl, butyl, amyl and hexyl groups may be either of the straight chain or branch chain type. The radical NRR' can also be a saturated nitrogen-containing heteromonocyclic group attached to the radical Alk' through a nitrogen in the heteromonocycle; examples for such heteromonocycles are N-morpholino, N-thiamorpholino, N'-alkyl-N-piperazino radicals, and especially radicals in which R and R' are combined to form lower alkylene chains of four to seven carbon atoms as in the case of N-pyrrolidino, N-piperidino, N-lupetidino and like radicals.

The organic bases of the foregoing type form salts with a variety of inorganic and strong organic acids including sulfuric, phosphoric hydrochloric, hydrobromic, sulfamic, citric, oxalic, ascorbic and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide and crotyl bromide.

The object of this invention is to provide novel chemical substances of the type indicated above. These new substances provide compounds of valuable therapeutic properties. Thus it has been found that the bases and their simple addition salts are active diuretics and that the quaternary ammonium salts of the type mentioned herein-above are inhibitors of ganglionic transmission of autonomic nerve impulses. In addition these salts have shown valuable effects on the cardiovascular system.

In the preparation of these amides it has been found useful in most cases to introduce the radical X—CO by treatment of basically alkyl-substituted diarylalkylamines of the type

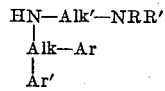

with an aroyl halide of the type

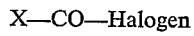

all symbols being defined as hereinabove. However I have found that it is preferable in certain instances to use the aromatic carboxylic acid X-COOH itself instead of the halide. It not only presents an advantage from the standpoint of cost but also because it permits the use of substituents on the Ar radical which would be destroyed or chemically altered in the process of the formation of the acid chloride as in the case of hydroxy and amino substituents.

The subsequent examples illustrate in detail certain of the compounds which constitute this invention and methods for their preparation. However this invention is not to be construed as limited thereby in spirit or in scope. Chemists skilled in the art of organic synthesis will recognize that many modifications in materials and methods can be practiced without departing from the invention. In each of these examples temperatures are given in degrees centigrade (° C.), relative amounts of materials in parts by weight, and pressures during vacuum distillation in millimeters (mm.) of mercury.

EXAMPLE 1

*N-(β-diethylaminoethyl)-N-benzhydrylbenzamide*

A solution of 312 parts of benzhydryl bromide in 880 parts of benzene is added to 300 parts of N,N-diethylethylenediamine and heated at reflux temperature for 12 hours. After cooling the mixture is treated with dilute hydrochloric acid. The acidic solution is rendered alkaline by the addition of dilute aqueous sodium hydroxide and the basic solution is extracted with ether. This ether extract is dried over anhydrous potassium carbonate, filtered and evaporated. The N-(β-diethylaminoethyl)benzhydrylamine is distilled at about 143–145° C. and 1 mm. pressure. Upon treatment of an ether solution of this base with one equivalent of alcoholic hydrogen chloride it forms a crystalline hydrochloride which, recrystallized from dilute isopropanol, melts at about 237–238° C.

A solution of 282 parts of N-(β-diethylaminoethyl)-benzhydrylamine and 140 parts of benzoyl chloride in 2600 parts of benzene is heated at reflux temperature for 12 hours, cooled and extracted with dilute hydrochloric acid. This extract is rendered alkaline by addition of aqueous sodium hydroxide and extracted with ether. The ether extract is dried over anhydrous potassium carbonate, filtered and evaporated to yield the N-(β-diethylaminoethyl)-N-benzhydrylbenzamide as a viscous oil which distils at about 224–226° C. and 1 mm. pressure. On standing the distillate solidifies. Recrystallized from petroleum ether it melts at about 87–88° C. Treatment of an ether solution of the base with one equivalent of a 25% solution of hydrogen chloride in anhydrous isopropanol yields the crystalline hydrochloride which, recrystallized from ethyl acetate and isopropanol, melts at about 187–188° C.

EXAMPLE 2

*β-(N'-benzhydrylbenzamido)ethyldiethylmethylammonium bromide*

To a solution of 140 parts of crystalline N-(β-diethylaminoethyl)-N-benzhydrylbenzamide in 400 parts of butanone, 173 parts of methyl bromide are added and, after standing at room temperature for several hours in a shielded pressure reactor, the mixture is chilled and treated with ether to induce separation of an oily precipitate. The latter is separated and dissolved in a mixture of ethyl acetate and isopropanol. Upon standing at 0° C. the N-(β-diethylaminoethyl)-N-benzhydrylbenzamide methobromide precipitates, which melts at about 187–188° C. The salt has the structural formula

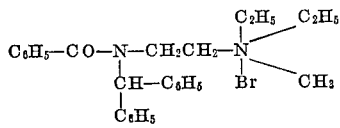

EXAMPLE 3

N - (β - diethylaminoethyl) - N - (α,β - diphenylethyl)-benzamide

A mixture of 196 parts of desoxybenzoin, 116 parts of N,N-diethylethylenediamine, 400 parts of ethanol and 50 parts of Raney nickel is hydrogenated in a Parr bomb at 500–600 lbs. pressure and 45–60° C. for 8 hours. After cooling the contents of the bomb are filtered and the filtrate is freed of solvent by vacuum distillation. The N-(β-diethylaminoethyl)-α,β-diphenylethylamine is distilled at about 138–141° C. and 0.2 mm. pressure.

A mixture of 296 parts of N-(β-diethylaminoethyl)-α,β-diphenylethylamine, 160 parts of benzoyl chloride and 1700 parts of anhydrous toluene is heated at reflux temperature for one hour and then treated with ice and dilute hydrochloric acid. The acidic layer is separated, rendered alkaline by addition of potassium hydroxide and extracted with ether. This extract is dried over anhydrous potassium carbonate, filtered and evaporated to yield an oily residue which is distilled at about 224–226° C. and 2 mm. pressure. The N-(β-diethylaminoethyl-N-(α,β-diphenylethyl)benzamide thus obtained has the structural formula

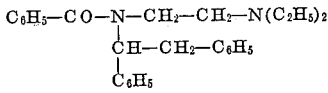

EXAMPLE 4

N - (β - diethylaminoethyl) - N - (α - benzylphenethyl)-benzamide

A mixture of 210 parts of 1,3-diphenyl-2-propanone, 116 parts of N,N-diethylethylenediamine, 400 parts of ethanol and 50 parts of Raney nickel is hydrogenated in a Parr bomb at 550–600 lbs. pressure and 60–70° C. for 17 hours. After cooling the contents of the bomb are filtered and the filtrate is concentrated in vacuo. The N-(β-diethylaminoethyl)-α-benzylphenethylamine is obtained by vacuum distillation at about 146–148° C. and 0.2 mm. pressure.

A mixture of 155 parts of N-(β-diethylaminoethyl)-α-benzylphenethylamine, 100 parts of benzoyl chloride and 1700 parts of anhydrous toluene is heated at reflux temperature for 2 hours and the resulting dark red solution is extracted with a large volume of dilute hydrochloric acid. The extract is rendered alkaline by addition of sodium hydroxide and extracted with ether. This ether extract is dried over anhydrous potassium carbonate, filtered and evaporated to yield the N-(β-diethylaminoethyl)-N-(α-benzylphenethyl)benzamide which distils at about 222–226° C. and about 2 mm. pressure. Treatment of an ether solution with alcoholic hydrogen chloride yields the hydrochloride which, recrystallized from isopropanol and ethyl acetate, melts at about 177–178° C. This salt has the structural formula

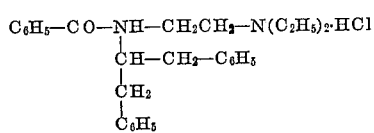

EXAMPLE 5

N - (β-dimethylaminoethyl) - N - (α,γ - diphenylbutyl)-benzamide

A mixture of 222 parts of dypnone and 88 parts of N,N-dimethylethylenediamine in 260 parts of benzene is heated at reflux temperature under a water separator for 10 hours, 20 parts of water being collected. 278 parts of the residue in 240 parts of ethanol are hydrogenated in the presence of 50 parts of Raney nickel for 13 hours at 115° C. and 570 lbs. pressure in a Parr bomb. The contents are removed, filtered and concentrated in vacuo. The residue is vacuum distilled, dissolved in ether and extracted with dilute hydrochloric acid. This extract is neutralized with sodium hydroxide and extracted with ether. The ether extract is dried over anhydrous potassium carbonate, filtered and evaporated, yielding the N-(β-dimethylaminoethyl)-α,γ-diphenylbutylamine as a residue which is distilled at about 134–136° C. and about 0.2 mm. pressure.

200 parts of this amine in 79 parts of anhydrous toluene are stirred with 100 parts of benzoyl chloride and, after standing for about an hour, a solid precipitate begins to form. The hydrochloride of N-(β-dimethylaminoethyl)-N-(α,γ-diphenylbutyl)benzamide is collected on a filter and recrystallized from hot butanone. It melts at about 154–156° C. and has the structural formula

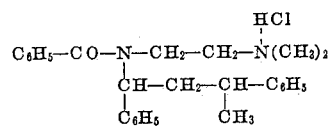

EXAMPLE 6

N - (δ -dimethylaminobutyl) - N - (di - p - tolylmethyl)-p-toluamide

A mixture of 132 parts of di-p-tolylbromomethane and 100 parts of N,N-dimethylputrescine in 300 parts of toluene is heated at reflux temperature for 12 hours and then treated with ice and dilute hydrochloric acid. The acidic solution is separated, washed with ether, rendered alkaline by addition of dilute ammonium hydroxide and extracted with ether. This ether extract is dried over anhydrous calcium sulfate, filtered, ether stripped and vacuum distilled. A solution of 154 parts of N-(δ-dimethylaminobutyl)-di-p-tolylmethylamine and 68 parts of p-toluyl chloride in 1400 parts of toluene is heated at reflux temperature for 12 hours, cooled and extracted with dilute hydrochloric acid. This extract is washed with ether, rendered alkaline by addition of aqueous sodium hydroxide and extracted with ether. The ether extract is dried over anhydrous calcium sulfate, filtered and ether stripped to yield the N-(δ-dimethylaminobutyl)-N-(di-p-tolylmethyl)-p-toluamide as a light orange oil which distils at about 231–239° C. and 2–3 mm. pressure. It has the structural formula

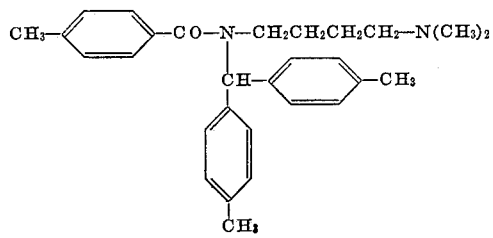

EXAMPLE 7

N - (β - dimethylaminoethyl) - N - [α - (1 - naphthyl)-benzyl]-p-anisoamide

A solution of 483 parts of 1-(α-chlorobenzyl)naphthalene in 1000 parts of benzene is added to 150 parts of N,N-dimethylethylenediamine and heated at reflux temperature for 10 hours. After cooling the mixture is extracted with dilute hydrochloric acid and the extract is rendered alkaline and extracted with ether. This ether extract is dried over anhydrous potassium carbonate and filtered. The filtrate is evaporated and the residue of N - (β - dimethylaminoethyl) - α - (1 - naphthyl)benzylamine vacuum distilled. A solution of 100 parts of this amine and 58 parts of p-anisoyl chloride in 1000 parts of benzene is heated at reflux temperature for 5 hours, cooled and extracted with dilute hydrochloric acid. This extract is washed with ether, rendered alkaline by addition of aqueous sodium hydroxide and extracted with ether. The ether extract is dried over anhydrous calcium sulfate, stirred with decolorizing charcoal, filtered and evaporated to yield the N-(β-dimethylaminoethyl)-N-

[α-(1-naphthyl)benzyl]-p-anisoamide as a high boiling, light amber oil which has the structural formula

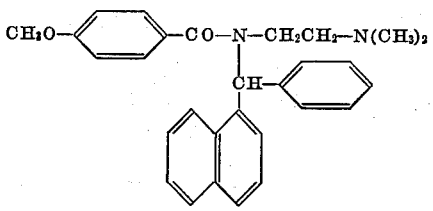

EXAMPLE 8

*N - (β - isopropylmethylaminoethyl) - N - [α - benzyl - β-(o-tolyl)ethyl]-o-chlorobenzamide*

A mixture of 224 parts of 1-o-tolyl-3-phenyl-2-propanone, 116 parts of N-isopropyl-N-methylethylenediamine, 400 parts of ethanol and 50 parts of Raney nickel are hydrogenated in a Parr bomb at 500–600 lbs. pressure and 60–70° C. for 16 hours. After cooling the contents of the bomb are filtered and the filtrate is concentrated in vacuo. The N-(β-isopropylmethylaminoethyl)-α-benzyl-β-(o-tolyl)ethylamine is obtained by vacuum distillation at about 144–149° C. and 0.1–0.15 mm. pressure.

A mixture of 64 parts of this distillate, 35 parts of o-chlorobenzoyl chloride and 500 parts of anhydrous toluene is heated at reflux temperature for 4 hours, cooled and treated with ice and highly diluted hydrochloric acid. The aqueous layer is separated, washed with ether, rendered alkaline by addition of sodium hydroxide and extracted with ether. This ether extract is dried over anhydrous calcium sulfate, stirred with charcoal, filtered and ether stripped. The residue is distilled at about 231–239° C. and 0.6–0.9 mm. pressure to yield the N-(β-isopropylmethylaminoethyl) - N - [α - benzyl - β - (o - tolyl)-ethyl]-o-chlorobenzamide as a clear colorless oil which has the structural formula

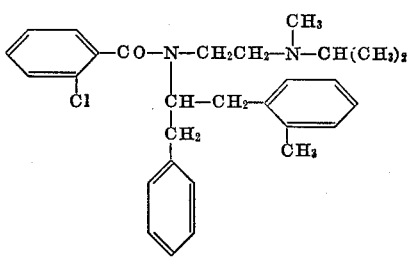

EXAMPLE 9

*N-(β-diethylaminoethyl)-N-[α-(2,4-xylyl)phenethyl]-o-iodobenzamide*

A mixture of 112 parts of 2,4-dimethyl-α-phenyl-acetophenone, 58 parts of N,N-diethylethylenediamine, 200 parts of ethanol and 60 parts of Raney nickel is hydrogenated in a Parr pressure bomb at 500–600 lbs. at 55–65° C. for 10 hours. The contents of the bomb are then cooled and filtered and the filtrate is freed of solvent by vacuum distillation. The N-(β-diethylaminoethyl)-α-(2,4-xylyl)phenethylamine is distilled at about 232–238° C. and 2–3 mm. pressure.

A mixture of 160 parts of this amine, 133 parts of o-iodobenzoyl chloride and 1400 parts of anhydrous xylene is heated at reflux temperature for 3 hours and then treated with ice and dilute hydrochloric acid. The aqueous layer is separated, alkalinized and extracted with ether. This extract is dried over anhydrous calcium sulfate, filtered and evaporated to yield the N-(β-diethylaminoethyl) - N - [α - (2,4 - xylyl)phenethyl] - o - iodobenzamide as a clear, amber, high boiling, oily residue. It has the structural formula

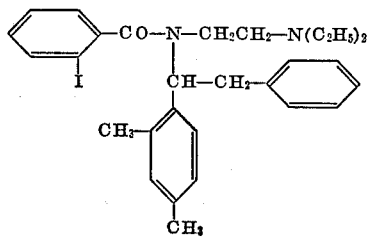

EXAMPLE 10

*N-(β-diethylaminoethyl)-N-(α,β-diphenylethyl)pyridine-3-carboxamide*

A mixture of 296 parts of N-(β-diethylaminoethyl)-α,β-diphenylethylamine, 178 parts of pyridine-3-carbonyl chloride hydrochloride and 2400 parts of butanone is stirred and heated at reflux temperature for 4 hours and then cooled and extracted with dilute hydrochloric acid. The acidic layer is separated, rendered alkaline by addition of sodium hydroxide and extracted with ether. This extract is dried over anhydrous potassium carbonate, filtered and evaporated to yield an oil which is distilled at about 230–235° C. and 1 mm. pressure. A solution of the base in a mixture of ether and benzene is treated with an excess of alcoholic hydrogen chloride which solidifies on standing. Recrystallized from a mixture of butanone and isopropanol, using charcoal decolorization, the hydrochloride of N-(β-diethylaminoethyl)-N-(α,β-diphenylethyl)pyridine-3-carboxamide is obtained in crystals which melt at about 182–184° C. This salt has the structural formula

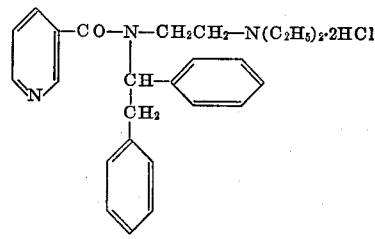

EXAMPLE 11

*N-(β-diethylaminoethyl)-N-benzhydrylcyclohexanecarboxamide*

A solution of 220 parts of N-(β-diethylaminoethyl)-benzhydrylamine in 2400 parts of benzene is heated with 110 parts of hexahydrobenzoyl chloride for 12 hours at reflux temperature and then cooled and extracted with dilute hydrochloric acid. The acid solution is rendered alkaline by addition of dilute ammonium hydroxide and extracted with ether. This extract is dried over anhydrous potassium carbonate, filtered, ether stripped and distilled at about 204–206° C. and 1 mm. pressure. The distillate, which solidifies at once, is recrystallized from petroleum ether and melts at about 102–103° C.

EXAMPLE 12

*N-(β-diethylaminoethyl)-N-benzhydrylbenzamide*

A mixture of 141 parts of N-(β-diethylaminoethyl)-benzhydrylamine and 61 parts of benzoic acid is heated on an open reaction dish for 4 hours at 225° C. without solvent. At the end of that period development of bubbles of steam has ceased. After cooling the reaction product is dissolved in ether and the ether solution is washed with dilute sodium carbonate solution, dried over anhydrous sodium sulfate, filtered and ether stripped. The residue of N-(β-diethylaminoethyl)-N-benzhydrylbenzamide is distilled at about 223–227° C. and 1 mm. pressure. On recrystallization from petroleum ether the product melts at about 86–88° C.

I claim:
1. An amide of the structural formula

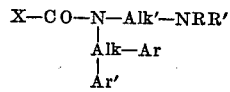

wherein X is an aromatic radical of the class consisting of aryl hydrocarbon, haloraryl and methoxyaryl radicals containing 6 to 12 carbon atoms, and pyridine; Ar and Ar' are aryl hydrocarbon radicals containing 6 to 12 carbon atoms; Alk is a lower alkylene radical; Alk' is a lower alkylene radical containing at least 2 carbon atoms; and R and R' are lower alkyl radicals.

2. An amide of the structural formula

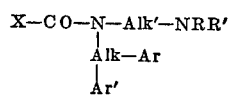

wherein X, Ar and Ar' are aryl hydrocarbon radicals containing 6 to 12 carbon atoms, Alk is a lower alkylene radical, Alk' is a lower alkylene radical containing at least 2 carbon atoms, and R and R' are lower alkyl radicals.

3. An amide of the structural formula

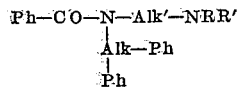

wherein Ph is phenyl, Alk is a lower alkylene radical, Alk' is a lower alkylene radical containing at least 2 carbon atoms, and R and R' are lower alkyl radicals.

4. An amide of the structural formula

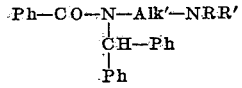

wherein Ph is phenyl, Alk' is a lower alkylene radical containing at least 2 carbon atoms, and R and R' are lower alkyl radicals.

5. N-($\beta$-diethylaminoethyl)-N-benzhydrylbenzamide.

6. An amide of the structural formula

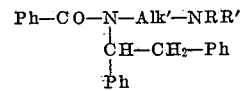

wherein Ph is phenyl, Alk' is a lower alkylene radical containing at least 2 carbon atoms, and R and R' are lower alkyl radicals.

7. N - ($\beta$ - diethylaminoethyl) - N - ($\alpha,\beta$-diphenethyl)benzamide.

8. An amide of the structural formula

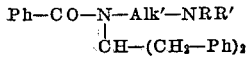

wherein Ph is phenyl, Alk' is a lower alkylene radical containing at least 2 carbon atoms, and R and R' are lower alkyl radicals.

9. N - ($\beta$ - diethylaminoethyl) - N - ($\alpha$ - benzyl - $\beta$-phenethyl)benzamide.

10. An amide of the structural formula

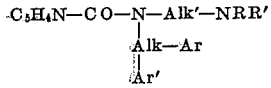

wherein $C_5H_4N$ is a pyridine radical, Ar and Ar' are aryl hydrocarbon radicals containing 6 to 12 carbon atoms, Alk is a lower alkylene radical, Alk' is a lower alkylene radical containing at least 2 carbon atoms, and R and R' are lower alkyl radicals.

11. An amide of the structural formula

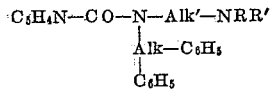

wherein $C_5H_4N$ is a pyridyl radical, Alk is a lower alkylene radical, Alk' is a lower alkylene radical containing at least 2 carbon atoms, and R and R' are lower alkyl radicals.

12. N - ($\beta$ - diethylaminoethyl) - N - ($\alpha,\beta$ - diphenethyl)-pyridine-3-carboxamide.

References Cited in the file of this patent

FOREIGN PATENTS

| Number | Country | Date |
|---|---|---|
| 368,590 | Great Britain | Mar. 10, 1932 |

OTHER REFERENCES

Villani: "J. Am. Chem. Soc.," vol. 72, June 1950, pp. 2724–27.